Figure 1:
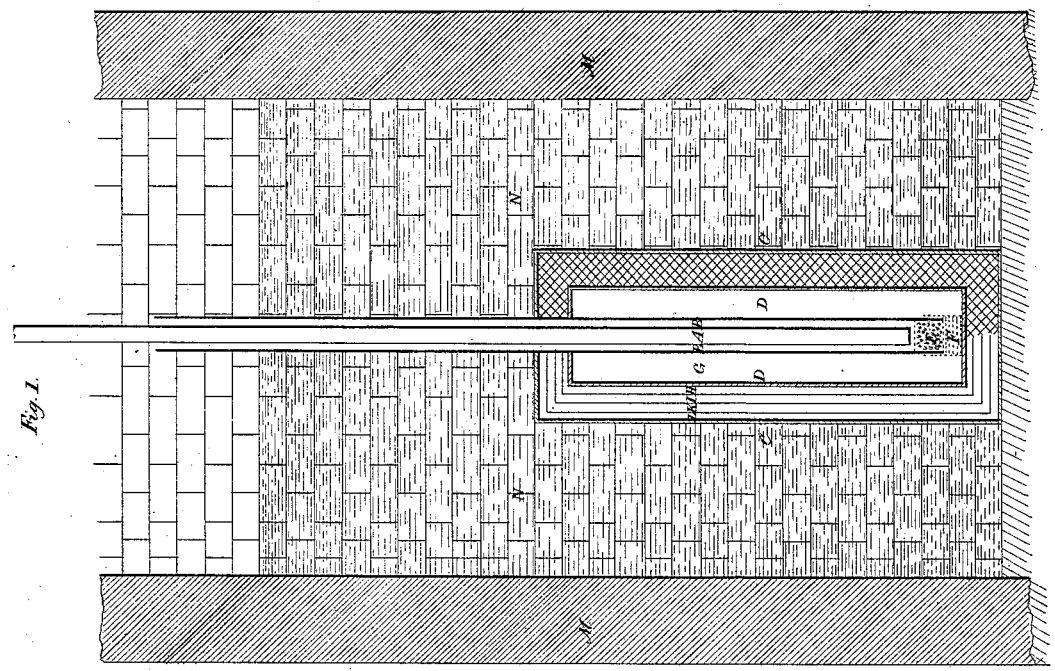

E. Andries,

Water Filter,

Nº 47,074.            Patented Mar. 28, 1865.

UNITED STATES PATENT OFFICE.

EDUART ANDRIES, OF SCHAERBEEK, BELGIUM.

IMPROVEMENT IN FILTERS.

Specification forming part of Letters Patent No. 47,074, dated March 28, 1865.

*To all whom it may concern:*

Be it known that I, EDUART ANDRIES, of Schaerbeek, near Brussels, in the Kingdom of Belgium, plumber, a subject of His Majesty the King of the Belgians, have invented or discovered new and useful improvements in means or apparatus for purifying every kind of water and rendering it drinkable and for rendering sea-water fresh and drinkable; and I, the said EDUART ANDRIES, do hereby declare the nature of the said invention and in what manner the same is to be performed to be particularly described and ascertained in and by the following statement thereof—that is to say:

My improvements relate to means or apparatus for purifying and rendering drinkable every kind of water, whether the same be unwholesome from contact with organic matters, such as weeds or plants or insects or other bodies in a more or less corrupt state, or from inorganic matter, or whether the water be combined with salt, as is the case with sea-water.

My said improvements consist in causing the water to traverse layers of animal black, (carbonized bone,) charcoal, coarse sand and coal, or other suitable substances, arranged in parallel layers between the surfaces of two cases or chests made of perforated metal, the one placed within the other around the suction or other pipe through which the water is to be drawn off for use. I place round the lower part of the pipe through which the water is to be drawn off a case or chest of any convenient form and size, made of perforated metal, and I surround or coat this chest on the outside with parallel layers of carbonized bone, charcoal, coarse sand and coal, or other suitable filtering matters, and I inclose the said inside chest and the said layers of filtering matter in a second outside metallic perforated casing. The outside surface of the inner metallic perforated casing and the inside surface of the exterior perforated casing may be lined with lined with linen or canvas or similar material. The water passes through the two perforated cases, the linen or other lining thereof, and the filtering matters inclosed between them to the inside of the interior chest, and is drawn off for use through the pipe or pipes penetrating into the said inside chest or cistern. At the bottom of the said pipe is a small metallic perforated chest, containing a sponge or other suitable porous substance, through which the water has to pass on being drawn off, the said sponge depriving it of any impurities which might have found their way into the inner chest.

The pipe through which the water is drawn off may be passed into the apparatus through a second pipe of larger diameter, attached to the filtering apparatus, and passing into the inner chest or cistern thereof in order, the said water-pipe being easily removed from the apparatus when required.

My filtering or purifying apparatus may be applied to ordinary pumps in ordinary cisterns or wells, or it may be placed in ships, boats, rivers, canals, or ponds, or in sea or other water. The said apparatus may also be constructed in a portable form for the use of military men or travelers.

Having now described the nature of my said invention, I will proceed to describe the manner in which the same is to be performed with reference to the accompanying drawings, in which my invention is represented applied to an ordinary well or cistern.

Figure 2:
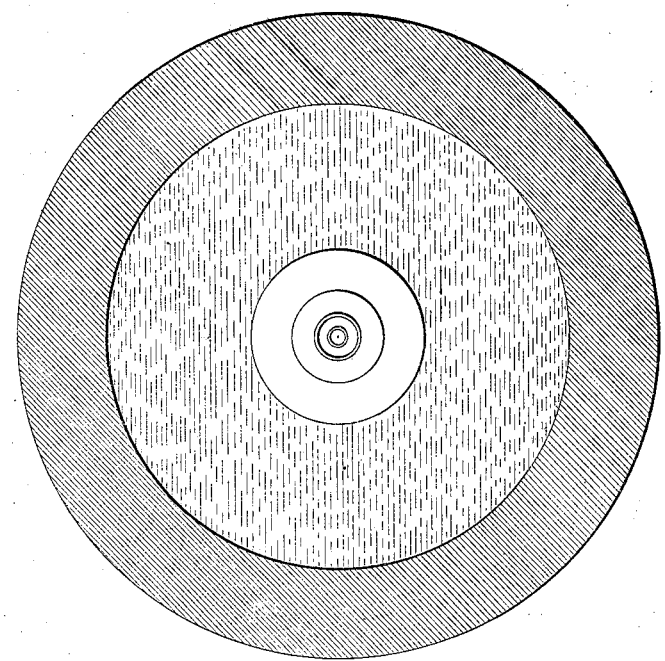

Figure 1 represents a transverse section of the apparatus and well. Fig. 2 is a plan of the same.

A represents the suction-pipe or pipe through which the water is drawn off by the pump or other means. B is a pipe of larger diameter affixed to my apparatus, and in which passes the pipe A.

Around the lower part of the pipes A and B, I place and affix a metallic perforated case or vessel, D, which may be cylindrical and flat at the top and bottom, the pipes A and B passing through the top, or it may be of any other convenient shape. The outside of the said case may be lined with linen, canvas, or other like material, and thereupon I place a layer of carbonized bone, H. Over this layer of carbonized bone I place a layer of charcoal, I, and over the charcoal I place a layer of coarse sand, K, upon which I place a layer of coal, L. I envelop these parallel layers of filtering matter with a perforated metallic chest, C, the inner surface of which may be covered with a lining of linen, canvas, or other suitable similar material. The space between the two perforated metallic cases C and D is thus filled with carbonized bone, charcoal, coarse sand, and coal, arranged in parallel layers H I K L, as shown.

The water to be purified or filtered passes through the perforated cases C and D and the layers of filtering material L K I H and the linen or other lining of the said perforated cases, and penetrates in a purified state into the inner case or chamber, G. From thence it passes through the sponge or other suitable porous substance E at the bottom of the pipes A B, and is sucked up or otherwise drawn off through the pipe A for use. The sponge E deprives the water of any impurity which may have passed into the inner case, G, such impurity falling into the part F under such sponge E.

M M are the walls of the well, and N N represent the water contained in the well.

I have not thought it necessary to describe particularly the other modes of applying my said invention, as the same will be readily understood from the above description of my apparatus applied to an ordinary well.

My apparatus may be made of any size or shape. When there is sufficient water, one apparatus may be made to supply five or six pumps with water, or my apparatus may be made of a portable form for the use of military men or travelers, and I have found in practice that a small apparatus, constructed according to my invention, about five inches high and four inches in diameter, with a section-pipe of about half an inch in diameter, will enable individuals to procure wholesome and pure water from stagnant or otherwise impure ponds or swamps.

I claim—

The specific combination of the filtering media, arranged in layers as set forth, the sponge at the end of the suction pipe, and the receptacle below the sponge for retaining the impurities.

EDUART ANDRIES.

Witnesses:
R. S. KIRKPATRICK,
W. H. KIRKPATRICK.